(12) United States Patent
Moon et al.

(10) Patent No.: US 9,100,956 B2
(45) Date of Patent: Aug. 4, 2015

(54) PREAMBLE TRANSMISSION DEVICE OF MULTI-MODE SUPPORTING BASE STATION AND PREAMBLE DETECTING DEVICE OF MULTI-MODE SUPPORTING USER TERMINAL

(71) Applicant: Electronics and Telecommunications Research Institute, Daejeon-si (KR)

(72) Inventors: Young-Jin Moon, Daejeon-si (KR); Jun-Woo Kim, Daejeon-si (KR); Youn-Ok Park, Daejeon-si (KR)

(73) Assignee: ELECTRONICS AND TELECOMMUNICATIONS RESEARCH INSTITUTE, Daejeon-Si (KR)

( * ) Notice: Subject to any disclaimer, the term of this patent is extended or adjusted under 35 U.S.C. 154(b) by 137 days.

(21) Appl. No.: 14/011,031

(22) Filed: Aug. 27, 2013

(65) Prior Publication Data

US 2014/0187278 A1    Jul. 3, 2014

(30) Foreign Application Priority Data

Jan. 2, 2013    (KR) ........................ 10-2013-0000308

(51) Int. Cl.
*H04W 72/00* (2009.01)
*H04W 72/04* (2009.01)
*H04B 10/2581* (2013.01)
*H04W 88/06* (2009.01)

(52) U.S. Cl.
CPC ......... *H04W 72/042* (2013.01); *H04B 10/2581* (2013.01); *H04W 88/06* (2013.01)

(58) Field of Classification Search
CPC . H04W 72/042; H04W 48/20; H04B 10/2581
USPC ......... 455/509, 452.1, 450, 517, 67.11, 550.1
See application file for complete search history.

(56) References Cited

U.S. PATENT DOCUMENTS

| | | | |
|---|---|---|---|
| 8,189,520 B2 | 5/2012 | Sung et al. | |
| 2008/0130570 A1* | 6/2008 | Jung et al. | 370/330 |
| 2012/0178454 A1 | 7/2012 | Kim et al. | |
| 2013/0095882 A1* | 4/2013 | Saito | 455/552.1 |
| 2014/0098777 A1* | 4/2014 | Lim et al. | 370/329 |

FOREIGN PATENT DOCUMENTS

| | | |
|---|---|---|
| KR | 10-1017970 B1 | 3/2011 |
| KR | 10-2012-0093529 A | 8/2012 |

* cited by examiner

*Primary Examiner* — John J Lee
(74) *Attorney, Agent, or Firm* — Rabin & Berdo, P.C.

(57) ABSTRACT

Provided are a preamble transmission device of a multi-mode supporting base station and a preamble detecting device of a multi-mode supporting user terminal. Selecting of the preamble signal is driven by the user terminal capable of supporting multi-modes, which contributes to smooth services from a user's viewpoint, and to effective use of the limited radio resources from an operator's viewpoint.

7 Claims, 4 Drawing Sheets

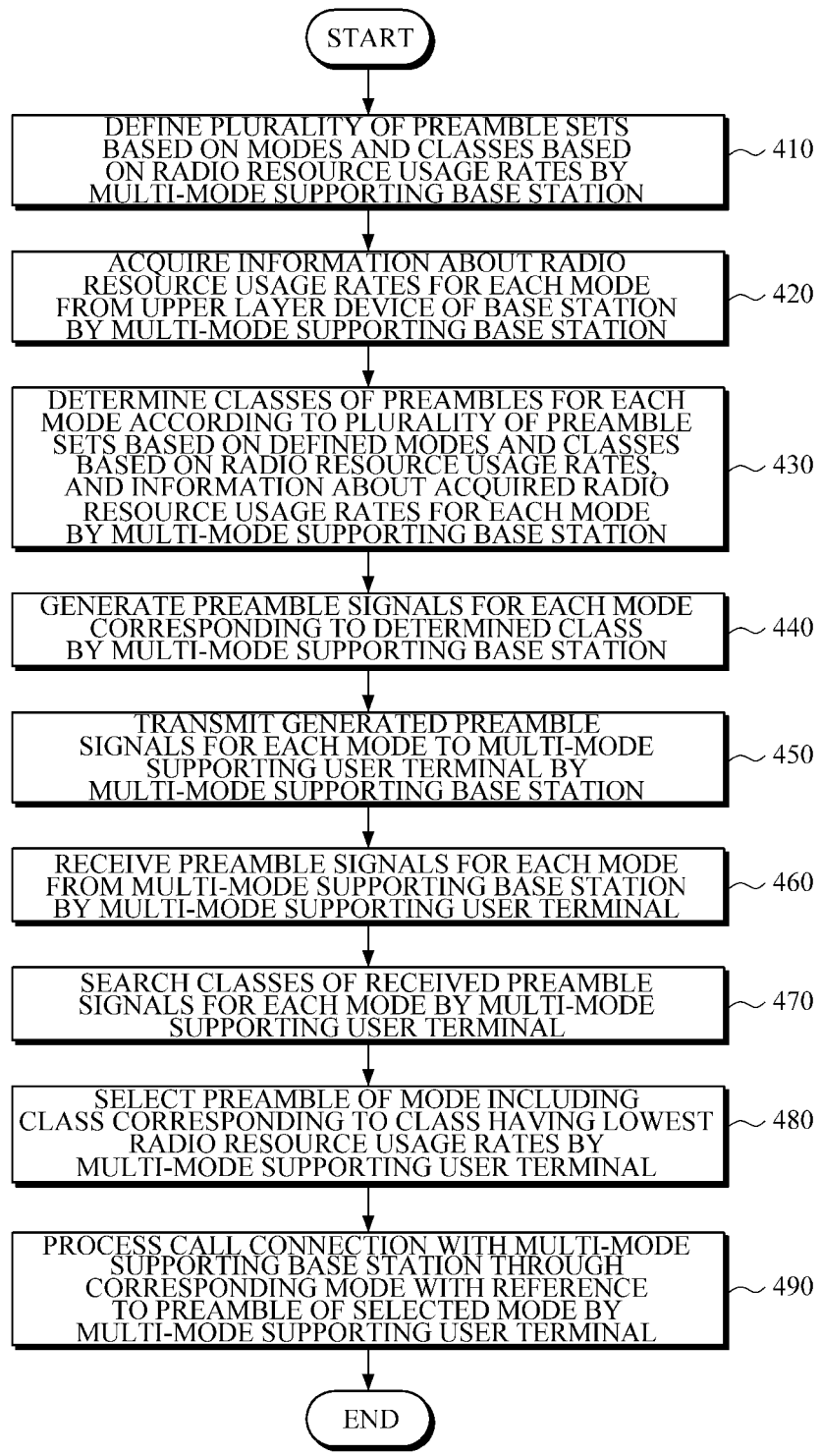

PREAMBLE TRANSMISSION DEVICE OF MULTI-MODE SUPPORTING BASE STATION AND PREAMBLE DETECTING DEVICE OF MULTI-MODE SUPPORTING USER TERMINAL

CROSS-REFERENCE TO RELATED APPLICATION

This application claims the benefit under 35 U.S.C. §119(a) of Korean Patent Application No. 10-2013-0000308, filed on Jan. 2, 2013, the entire disclosure of which is incorporated herein by reference for all purposes.

BACKGROUND

1. Field

The following description relates to preamble signal processing technology, and more particularly, to a preamble transmission device of a multi-mode supporting base station and a preamble detecting device of a multi-mode supporting user terminal.

2. Description of the Related Art

Technology associated with preamble processing was proposed in, for example, Korean Patent No. 10-1017970 (Feb. 21, 2011). Korean Patent No. 10-1017970 includes defining an inherent index for each frequency allocation (FA), allocating a preamble pseudo noise (PN) index to base stations using a reference FA index, defining an inherent offset by each FA for remaining FA indexes, shifting the preamble PN index allocated to the base stations using the reference FA index by the defined offset, and allocating the preamble PN index to base stations using the remaining FA indexes.

Recently, many studies and applications about a structure of a dual function-distributed base station in which a radio unit (RU) to handle a radio frequency (RF) function and a digital unit (DU) to handle a baseband and protocol functions are spatially separated are under development.

The function-distributed base station structure has an advantage in that processes for multi-modes are centrally handled in the DU, a concept of a cloud base station to share resources is introduced, and thereby utilizations and yields of the resources are maximized by cooperative communication between base stations.

The multi-mode supporting cloud base station may independently transmit preamble signals for each mode in one cell. However, a single-mode user terminal detects only the preamble signal adequate for its mode, automatically controls a size of receiving signals, performs synchronization procedures, and processes calls.

Therefore, conventional systems are implemented assuming an environment in which the base station supports multi-modes, but the user terminal supports only a single-mode, and therefore the base station manages radio resources.

Under this environment, the base station centrally manages the radio resources, but it is difficult to effectively select the mode according to a radio resource usage rate when there is a terminal that can support multi-modes using the conventional systems.

Accordingly, the inventors studied preamble processing technology for selecting the preamble signals by effectively selecting the mode according to the radio resource usage rate in a user terminal capable of supporting multi-modes, which contributes to smooth services from a user's viewpoint, and to effective use of the limited radio resources from an operator's viewpoint.

SUMMARY

The following description relates to a preamble transmission device of a multi-mode supporting base station capable of generating preamble signals that may select preamble signals driven by a multi-mode supporting user terminal.

Moreover, the following description relates to a preamble detecting device of a multi-mode supporting user terminal that may effectively select a mode according to the radio resource usage rate in the user terminal capable of supporting multi-modes, which contributes to smooth services from a user's viewpoint, and to effective use of the limited radio resources from an operator's viewpoint.

In one general aspect, there is provided a preamble transmission device of a multi-mode supporting base station including, a preamble defining unit configured to define a plurality of preamble sets based on modes and classes based on radio resource usage rates, an information acquisition unit configured to acquire information about radio resource usage rates for each mode from an upper layer device of the base station, a class determining unit configured to determine classes of preambles for each mode according to the plurality of preamble sets based on modes and the classes based on the radio resource usage rates defined in the preamble defining unit, and the information about the radio resource usage rates for each mode acquired in the information acquisition unit, a preamble generating unit configured to generate preamble signals for each mode corresponding to the class determined by the class determining unit, and a preamble transmitting unit configured to transmit the preamble signals for each mode generated by the preamble generating unit to a multi-mode supporting user terminal.

In the preamble transmission device of the multi-mode supporting base station, the preamble signal for each mode generated by the preamble generating unit may include mode identification information and class information.

In the preamble transmission device of the multi-mode supporting base station, the preamble transmitting unit may transmit the preamble signals for each mode through a plurality of radio channels having no interference with each other in a distributed manner.

In another aspect, there is provided a preamble detecting device of a multi-mode supporting user terminal including a preamble receiving unit configured to receive preamble signals for each mode from a multi-mode supporting base station, a class searching unit configured to search classes of the preamble signals for each mode received by the preamble receiving unit, and a preamble selecting unit configured to select the preamble of the mode including the class corresponding to the class having the lowest radio resource usage rate searched by the class searching unit.

The preamble detecting device of the multi-mode supporting user terminal may further include a call processing unit configured to process a call connection with the multi-mode supporting base station through the corresponding mode with reference to the preamble of the mode selected by the preamble selecting unit.

In the preamble detecting device of the multi-mode supporting user terminal, the class searching unit may determine modes with reference to mode identification information included in the preamble signal for each mode and determine classes with reference to class information.

In the preamble detecting device of the multi-mode supporting user terminal, the preamble receiving unit may receive the preamble signals for each mode through a plurality of radio channels having no interference with each other in a distributed manner.

According to the invention, since selecting of the preamble signal is driven by the user terminal capable of supporting multi-modes, it is possible to prevent unnecessary data exchange between the base station and the user terminal to select the preamble, thereby preventing waste of the radio resources.

Moreover, according to the invention, the user terminal capable of supporting multi-modes effectively selects the mode based on the radio resource usage rates, which contributes to smooth services from the user's viewpoint, and to effective use of the limited radio resources from the operator's viewpoint.

Other features and aspects will be apparent from the following detailed description, the drawings, and the claims.

BRIEF DESCRIPTION OF THE DRAWINGS

FIG. 4 is an exemplary flowchart for describing operations of preamble signal processing in the multi-mode supporting base station and multi-mode supporting user terminal.

Figure 1:
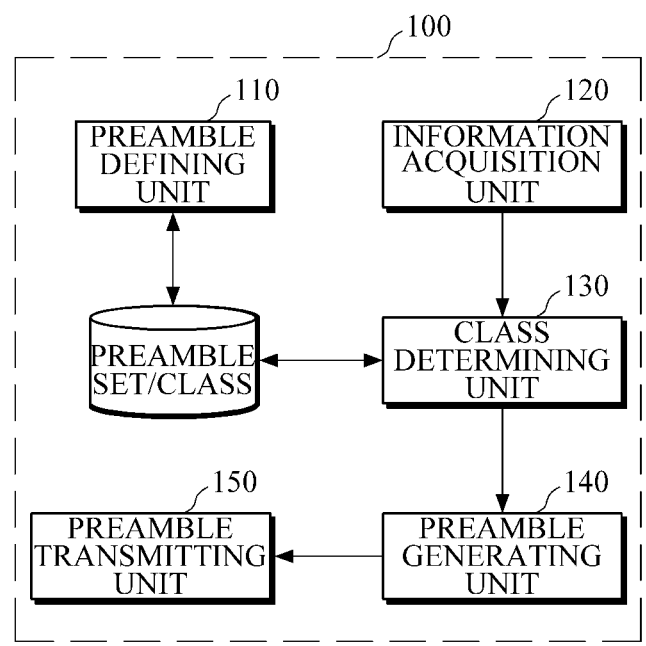
FIG. 1 is a block diagram illustrating a configuration of a preamble transmission device of a multi-mode supporting base station according to an embodiment of the invention.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Hereinafter, in order to facilitate understanding and reproduce by those skilled in the art, the present invention will be described in detail by explaining exemplary embodiments with reference to the accompanying drawings.

When it is determined that detailed explanations of related well-known functions and configurations unnecessarily obscure gist of the embodiments, the detailed description thereof will not be repeated.

The terminology used herein is defined by considering a function in the embodiments, and meanings may vary depending on, for example, a user or operator's intentions or customs. Therefore, the meanings of terms used in the embodiments should be interpreted based on the scope throughout this specification.

FIG. 1 is a block diagram illustrating a configuration of a preamble transmission device of a multi-mode supporting base station according to an embodiment of the invention. As illustrated in FIG. 1, a preamble transmission device 100 of the multi-mode supporting base station according to the embodiment includes a preamble defining unit 110, an information acquisition unit 120, a class determining unit 130, a preamble generating unit 140, and a preamble transmitting unit 150.

The multi-mode supporting base station is a base station that can handle a plurality of wireless protocols. The base station communicates with user terminals in the cell using any one wireless protocol selected from the plurality of wireless protocols.

Figure 2:
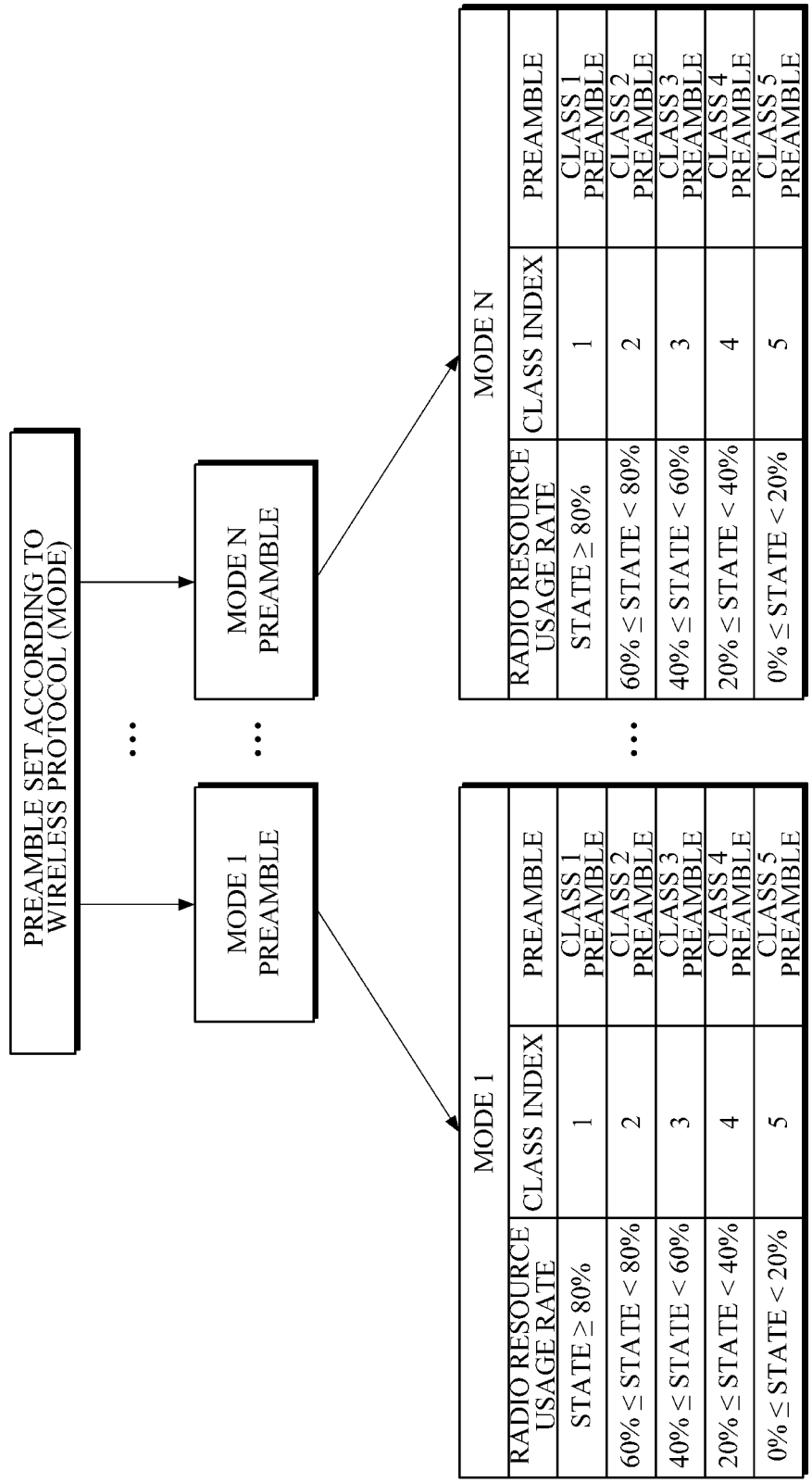
FIG. 2 is a diagram illustrating an example of a set of preambles defined by the preamble transmission device of the multi-mode supporting base station and classes based on radio resource usage rates according to the invention.

The preamble defining unit 110 defines a plurality of preamble sets based on modes and classes based on radio resource usage rates. As illustrated in FIG. 2, it is possible to define a set of preambles including the total number of N preambles from mode 1 to mode N using the preamble defining unit 110.

For example, as illustrated in FIG. 2, it is possible to define classes divided into class indexes 1 to 5 with respect to preambles for each mode based on the radio resource usage rates using the preamble defining unit 110.

FIG. 2 is a diagram illustrating an example of a set of preambles defined by the preamble transmission device of the multi-mode supporting base station and classes based on the radio resource usage rates according to the invention. In FIG. 2, the class indexes are defined such that the index is set to 1 when the radio resource usage rate is equal to or greater than 80%, the index is set to 2 when the radio resource usage rate is equal to or greater than 60% and less than 80%, the index is set to 3 when the radio resource usage rate is equal to or greater than 40% and less than 60%, the index is set to 4 when the radio resource usage rate is equal to or greater than 20% and less than 40%, and the index is set to 5 when the radio resource usage rate is equal to or greater than 0% and less than 20%.

The information acquisition unit 120 acquires information about radio resource usage rates for each mode from an upper layer device of the base station. For example, the upper layer device of the base station may be a base station controller (not illustrated) to control the plurality of base stations. Since various technologies for detecting the radio resource usage rate in the upper layer device of the base station are already known and commonly used prior to this application, a detailed description thereof will not be omitted.

The class determining unit 130 determines classes of preambles for each mode according to the plurality of preamble sets based on modes and the classes based on the radio resource usage rates defined in the preamble defining unit 110, and the information about the radio resource usage rates for each mode acquired in the information acquisition unit 120.

For example, the plurality of preamble sets based on modes and the classes based on the radio resource usage rates defined in the preamble defining unit 110 are defined as illustrated in FIG. 2. When the radio resource usage rate of the wireless protocol corresponding to mode 1 acquired by the information acquisition unit 120 is equal to or greater than 45%, the class determining unit 130 may be implemented to determine the preamble class of mode 1 as class index 3.

The preamble generating unit 140 generates preamble signals for each mode corresponding to the class determined by the class determining unit 130. In this case, the preamble signal for each mode generated by the preamble generating unit 140 may include mode identification information and class information.

For example, the mode identification information may be a mode number from modes 1 to N and the class information may be a class index number from class indexes 1 to 5 as illustrated in FIG. 2.

The preamble signal is transmitted to synchronize systems between the base station and the user terminal. Since various preamble data generation algorithms included in the preamble signal for synchronization are already known and commonly used prior to this application, a detailed description thereof will not be omitted.

The preamble transmitting unit 150 transmits the preamble signals for each mode generated by the preamble generating unit 140 to the multi-mode supporting user terminal. In this case, the preamble transmitting unit 150 may be implemented to transmit the preamble signals for each mode through a plurality of radio channels having no interference with each other in a distributed manner.

The preamble signals for each mode transmitted by the preamble transmitting unit 150 are transmitted to the multi-mode supporting user terminals in the cell so that selecting of the preamble signal is driven by the multi-mode supporting user terminals.

The multi-mode supporting user terminal is a user terminal, for example, a smart phone held by a user that can handle the plurality of wireless protocols. The user terminal communicates with the base station using any one wireless protocol selected from the plurality of wireless protocols.

Figure 3:
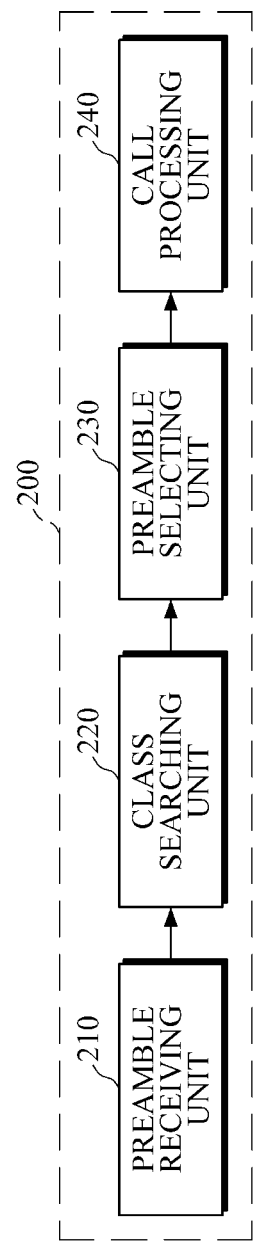
FIG. 3 is a block diagram illustrating a configuration of a preamble detecting device of a multi-mode supporting user terminal according to the embodiment of the invention.

FIG. 3 is a block diagram illustrating a configuration of a preamble detecting device of the multi-mode supporting user terminal according to the embodiment of the invention. As illustrated in FIG. 3, a preamble detecting device 200 of the multi-mode supporting user terminal according to the embodiment includes a preamble receiving unit 210, a class searching unit 220, and a preamble selecting unit 230.

The preamble receiving unit 210 receives preamble signals for each mode from the multi-mode supporting base station. In this case, the preamble receiving unit 210 may be implemented to receive the preamble signals for each mode through the plurality of radio channels having no interference with each other in a distributed manner.

The class searching unit 220 searches classes of the preamble signals for each mode received by the preamble receiving unit 210. For example, the class searching unit 220 may be implemented to determine modes with reference to the mode identification information included in the preamble signal for each mode and to determine classes with reference to the class information.

The preamble selecting unit 230 selects the preamble of the mode including the class corresponding to the class having the lowest radio resource usage rate searched by the class searching unit 220. For example, the preamble selecting unit 230 may be implemented to select the preamble signal of the mode having the greatest class index illustrated in FIG. 2 in the received preamble signals for each mode. In FIG. 2, the higher the class index, the lower the radio resource usage rate.

Meanwhile, in another aspect of the invention, the preamble detecting device 200 of the multi-mode supporting user terminal may further include a call processing unit 240. The call processing unit 240 processes a call connection with the multi-mode supporting base station through the corresponding mode with reference to the preamble of the mode selected by the preamble selecting unit 230. In this case, before the call processing unit 240 processes the call connection with the multi-mode supporting base station, the synchronization procedure between the multi-mode supporting user terminal and the multi-mode supporting base station may be carried out.

In such a configuration, since selecting of the preamble signal of the mode having the lowest radio resource usage rate is driven by the user terminal capable of supporting multi-modes, it is possible to prevent unnecessary data exchange between the base station and the user terminal to select the preamble, thereby preventing waste of the radio resources.

Accordingly, the invention allows the user terminal capable of supporting multi-modes to effectively select the mode according to the radio resource usage rate, which contributes to smooth services from a user's viewpoint, and to effective use of the limited radio resources from an operator's viewpoint.

With reference to FIG. 4, operations of preamble signal processing in the multi-mode supporting base station and the multi-mode supporting user terminal will be described. FIG. 4 is an exemplary flowchart for describing the operations of the preamble signal processing in the multi-mode supporting base station and multi-mode supporting user terminal.

First, in operation 410, the multi-mode supporting base station defines the plurality of preamble sets based on modes and classes based on the radio resource usage rates. Since this has already been described, the detailed description thereof will not be repeated.

Next, in operation 420, the multi-mode supporting base station acquires information about radio resource usage rates for each mode from the upper layer device of the base station. Since this has already been described, the detailed description thereof will not be repeated.

Next, in operation 430, the multi-mode supporting base station determines classes of preambles for each mode according to the plurality of preamble sets based on modes and the classes based on the radio resource usage rates defined in operation 410, and information about the radio resource usage rates for each mode acquired in operation 420. Since this has already been described, the detailed description thereof will not be repeated.

Next, in operation 440, the multi-mode supporting base station generates preamble signals for each mode corresponding to the class determined in operation 430. Since this has already been described, the detailed description thereof will not be repeated.

Next, in operation 450, the multi-mode supporting base station transmits the preamble signals for each mode generated in operation 440 to the multi-mode supporting user terminal. Since this has already been described, the detailed description thereof will not be repeated.

Then, in operation 460, the multi-mode supporting user terminal receives the preamble signals for each mode from the multi-mode supporting base station. Since this has already been described, the detailed description thereof will not be repeated.

Next, in operation 470, the multi-mode supporting user terminal searches classes of the preamble signals for each mode received in operation 460. Since this has already been described, the detailed description thereof will not be repeated.

Next, in operation 480, the multi-mode supporting user terminal selects the preamble of the mode including the class corresponding to the class having the lowest radio resource usage rate searched in operation 470. Since this has already been described, the detailed description thereof will not be repeated.

Next, in operation 490, the multi-mode supporting user terminal processes the call connection with the multi-mode supporting base station through the corresponding mode with reference to the preamble of the mode selected in operation 480. Since this has already been described, the detailed description thereof will not be repeated.

In such a configuration, since selecting of the preamble signal of the mode having the lowest radio resource usage rate is driven by the user terminal capable of supporting multi-modes, it is possible to prevent unnecessary data exchange between the base station and the user terminal to select the preamble, thereby preventing waste of the radio resources.

Moreover, the invention allows the user terminal capable of supporting multi-modes to effectively select the mode according to the radio resource usage rates, which contributes to smooth services from the user's viewpoint, and to effective use of the limited radio resources from the operator's viewpoint. In this way, it is possible to achieve the above-mentioned purposes of the invention.

While the present invention has been particularly described with reference to exemplary embodiments, it is apparent that various modifications may be made without departing from the spirit and scope of the invention as defined by the appended claims.

The present invention can be implemented as computer-readable code in a computer-readable recording medium. The computer-readable recording medium includes all types of recording media in which computer-readable data is stored. Examples of the computer-readable recording medium include a ROM, a RAM, a CD-ROM, a magnetic tape, a floppy disk, and an optical data storage. Further, the recording medium may be implemented in the form of carrier waves, such as those used in Internet transmission. In addition, the computer-readable recording medium may be distributed among computer systems over a network such that computer-readable codes may be stored and executed in a distributed manner.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A preamble transmission device of a multi-mode supporting base station that processes a plurality of wireless protocols comprising:
    a preamble defining unit configured to define a plurality of preamble sets based on modes and classes based on radio resource usage rates;
    an information acquisition unit configured to acquire information about the radio resource usage rates for each mode from an upper layer device of the multi-mode supporting base station;
    a class determining unit configured to determine classes of preambles for each mode according to the plurality of preamble sets based on the modes and the classes based on the radio resource usage rates defined by the preamble defining unit, and the information about the radio resource usage rates for each mode acquired by the information acquisition unit;
    a preamble generating unit configured to generate preamble signals for each mode corresponding to the class determined by the class determining unit; and
    a preamble transmitting unit configured to transmit the preamble signals for each mode generated by the preamble generating unit to a multi-mode supporting user terminal.

2. The device according to claim 1, wherein the preamble signal for each mode generated by the preamble generating unit includes mode identification information and class information.

3. The device according to claim 1, wherein the preamble transmitting unit transmits the preamble signals for each mode through a plurality of radio channels having no interference with each other in a distributed manner.

4. A preamble detecting device of a multi-mode supporting user terminal that processes a plurality of wireless protocols comprising:
    a preamble receiving unit configured to receive preamble signals for each mode from a multi-mode supporting base station;
    a class searching unit configured to search classes of the preamble signals for each mode received by the preamble receiving unit; and
    a preamble selecting unit configured to select the preamble of a mode including a class corresponding to the class having the lowest radio resource usage rate searched by the class searching unit.

5. The device according to claim 4, further comprising a call processing unit configured to process a call connection with the multi-mode supporting base station through the corresponding mode with reference to the preamble of the mode selected by the preamble selecting unit.

6. The device according to claim 4, wherein the class searching unit determines modes with reference to mode identification information and determines classes with reference to class information included in the preamble signal for each mode.

7. The device according to claim 4, wherein the preamble receiving unit receives the preamble signals for each mode through a plurality of radio channels having no interference with each other in a distributed manner.

* * * * *